United States Patent [19]

Luxenberg et al.

[11] Patent Number: 5,120,076

[45] Date of Patent: Jun. 9, 1992

[54] METHOD OF EVALUATING DATA RELATING TO A COMMON SUBJECT

[75] Inventors: Robert A. Luxenberg, Sunnyvale; Robert J. Brown, Los Altos Hills, both of Calif.

[73] Assignee: Interactive Network, Inc., Mountain View, Calif.

[21] Appl. No.: 692,816

[22] Filed: Apr. 25, 1991

Related U.S. Application Data

[60] Continuation-in-part of Ser. No. 643,740, Jan. 22, 1991, abandoned, which is a division of Ser. No. 448,001, Dec. 8, 1989, Pat. No. 5,013,038.

[51] Int. Cl.$^5$ .......................... A63F 9/22; H04N 9/00
[52] U.S. Cl. ...................... 273/439; 379/92; 358/84; 455/2
[58] Field of Search ............ 273/439, 434, 138 A, 273/85 G, DIG. 28; 358/84, 85, 86; 455/2; 379/92, 93

[56] References Cited

U.S. PATENT DOCUMENTS

| | | | |
|---|---|---|---|
| 3,947,624 | 3/1976 | Miyake | 358/84 |
| 4,107,735 | 8/1978 | Frohbach | 358/84 |
| 4,151,370 | 4/1979 | Root | 455/2 |
| 4,592,546 | 6/1986 | Frascenda et al. | 273/439 |
| 4,630,108 | 12/1986 | Gomersall | 358/84 |
| 4,722,526 | 2/1988 | Trovar et al. | 273/439 |
| 4,876,592 | 10/1989 | Von Kohorn | 455/2 |

*Primary Examiner*—William H. Grieb
*Assistant Examiner*—Jessica J. Harrison
*Attorney, Agent, or Firm*—Flehr, Hohbach, Test, Albritton & Herbert

[57] ABSTRACT

A method of determining the winners of, for example, a game of skill in conjunction with a football or baseball game without the input of all the scores is provided. By the use of statistical sampling a small fraction of the remote players upload their scores to a central station via a telephone line, for example. Then, when the tentative winners are determined from this small statistical sample, the mass communications link of the system downloads the statistical curve to all of the players and only those players who are equal or better than the winning score telephone. Thus, time and money are saved for the telephone up-link. Furthermore, overcrowding of the telephone system is avoided by a proper delay given the individual remote sources.

2 Claims, 6 Drawing Sheets

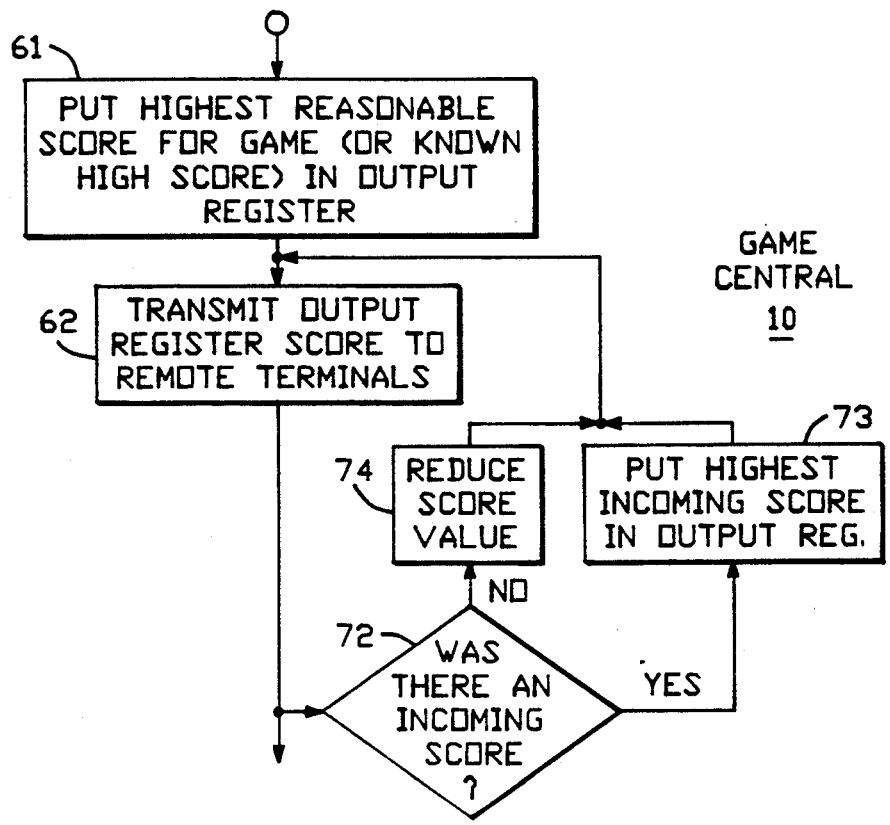
FIG.−6
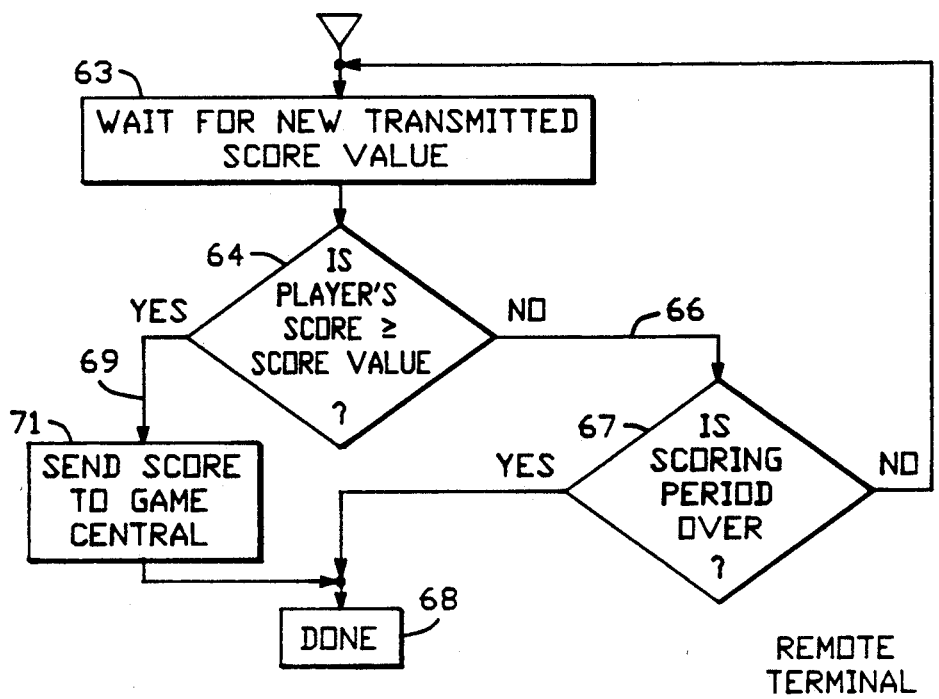
FIG.−7

METHOD OF EVALUATING DATA RELATING TO A COMMON SUBJECT

This is a continuation-in-part, of application Ser. No. 643,740, filed Jan. 22, 1991, abandoned, which is a division of Ser. No. 448,001, filed Dec. 8, 1989, now U.S. Pat. No. 5,013,038.

The present invention is directed to a method of evaluating data relating to a common subject from a plurality of remote data sources and more particularly to sampling the remote data sources to avoid the input of all data.

BACKGROUND OF THE INVENTION

As described in the Lockton, et al., U.S. Pat. No. 4,592,546, home television viewers of a football game may attempt to predict, for example, the play to be called by the quarterback and then be scored on their success. As suggested by the patent, the overall control of this scoring is done by a one-way mass communications link from a central station; for example, it may be the SCA channel of an FM radio station or a vertical blanking interval (VBI-Teletext) of a television program itself. Then the score is stored at the home viewer's location, which can be characterized a remote data source, and is uploaded to a central station by, for example, a telephone call.

One difficulty with the foregoing is that the uploading of all information to a central computer via the telephone system may overload the telephone exchanges, especially in large cities. Of course, the same is true if a packet type system is used to collect data for final communication with a central telephone office. This might especially be of a Superbowl football game or a World Series baseball game. Of course, one of the incentives to playing the game—even if the player may have a relatively low score—is to determine his rank or percentile standing with regard to the remainder of the participants.

Another technique of evaluating responses to a broadcast television program is shown in the Von Kohorn U.S. Pat. No. 4,745,468 which discloses the technique of competing, for example, in a television game show. It is also stated to be applicable to a football game. Here the viewers' scores and/or responses are recorded on a magnetic card. Then the card may be physically taken to some central location to receive a prize. Here again, the ranking or percentile standing of a particular player is not immediately known.

OBJECT AND SUMMARY OF INVENTION

It is therefore a general object of the present invention to provide an improved method of evaluating data relating to a common subject from a plurality of remote data sources.

In accordance with the above object there is provided a method of evaluating data relating to a common subject from a plurality of remote data sources where each source may be down-loaded information on a one-way mass communications link from a central station but must up-load from each of the remote sources to a central station by a dedicated and exclusive communications up-link. The method comprises the steps of statistically sampling a plurality of the remote data sources, such plurality being a small fraction of the total number of the data sources. Such sampling is accomplished by signaling the mass communications link. Each of the data sources is responsive to the signaling to up-load data via the dedicated and exclusive respective up-links to the central station. At the central station a statistical curve is determined related to this statistically sampled data and information as to such curve is downloaded via the mass communications link to the remote sources. This is for use in comparing the data of each remote source to the statistical curve to determine an accurate percentile standing.

BRIEF DESCRIPTION OF THE DRAWINGS

FIG. 6 is a flow chart showing another embodiment of the invention related to the game central.

FIG. 7 is a flow chart showing the embodiment of FIG. 6 but related to the remote terminal.

DETAILED DESCRIPTION OF THE PREFERRED EMBODIMENTS

Figure 1:
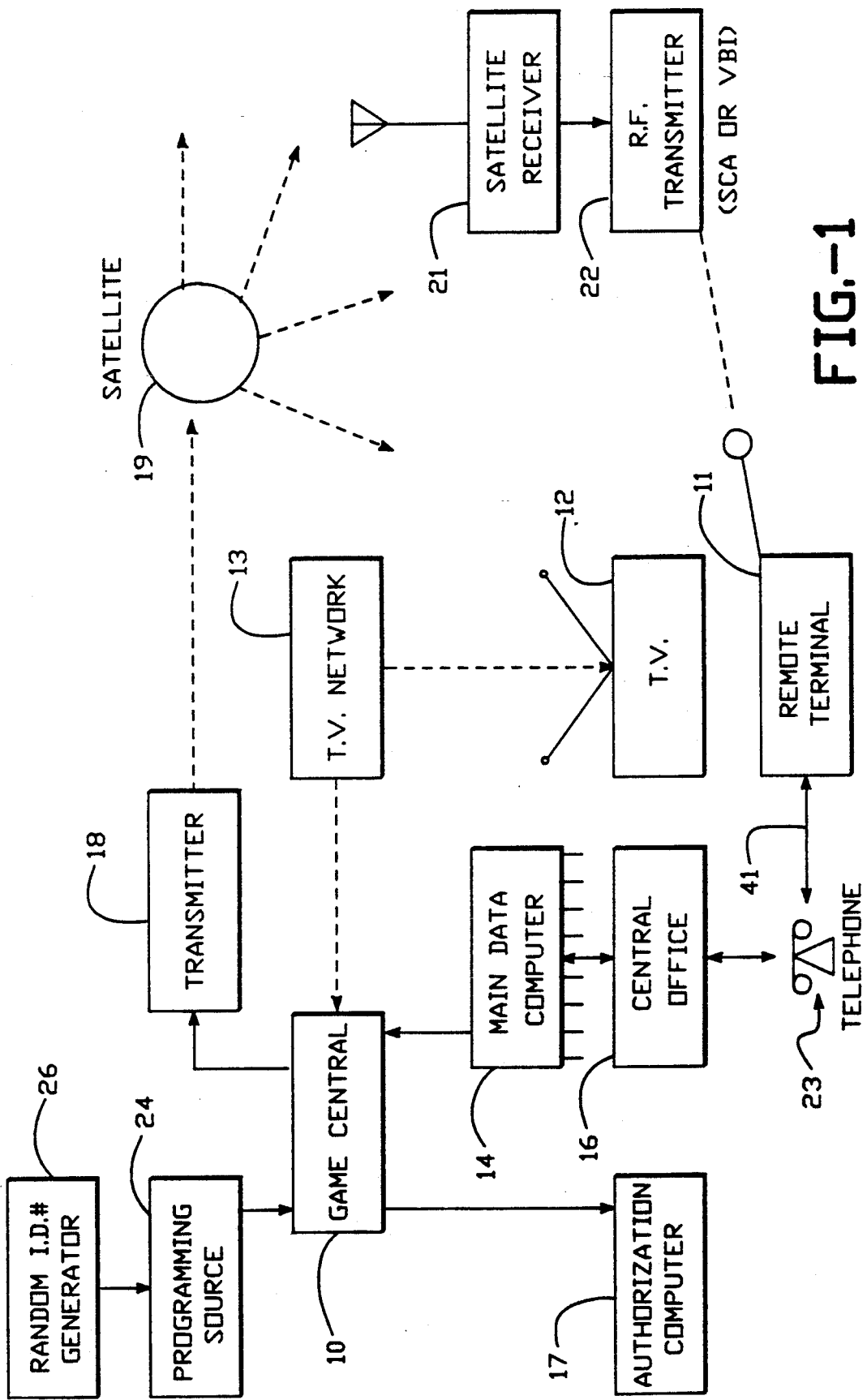
FIG. 1 is an overall block diagram of a system incorporating the present invention.

FIG. 1 shows a communications network with a central station 10 and one of many remote terminals or data sources 11. Associated with the remote terminal 11 would normally be a television receiver 12 to receive, for example, the football or baseball game on which the game might be based. Although in a description of prior art, such as in the above Lockton, et al., patent, football has been emphasized, other games could be video computer games and/or a quiz show; furthermore, a specialized television show for purely commercial purposes,, for example, to evaluate a proposed new product of a manufacturer. Here the television viewer would be asked to respond to the new product as certain features are mentioned or introduced.

In any case, in one embodiment the television receiver 12 would receive the football game from a TV network illustrated at 13, which signal is also received by game central 10 for purposes of timing, as described in the Lockton, et al., patent. For example, a lockout signal would normally be transmitted to the remote terminal 11 after the snap of the ball in the football game to prevent late guesses as to the type of play that was called.

Associated with the game central 10 which would normally be a computerized office is a main data computer 14 for receiving the game scores from several central telephone offices 16. In conjunction with the central offices 16, the authorization computer 17 would determine whether to accept the information in accordance with an authorization code which might be the remote terminal's identification number and other security checks.

Control information as to the game itself (such as the lockout signal) might be handled in the same manner as in the Lockton, et al., patent where a transmitter 18 provides data on a subcarrier (SCA) channel of an FM radio station or the vertical blanking interval television station via satellite 19. This information might be received by satellite receiver 21 and retransmitted via RF transmitter 22 to the remote terminals 11. After the playing of the dame or the time which has been designated for returning responses to the central station 10, remote terminal 11 utilizes its telephone 23 to communicate, if necessary, its data to game central 10. This telephone link might broadly be characterized as an up-link which is a dedicated and exclusive communications channel. Naturally, it has capacity limitations and is much more expensive than the down-link, which is the mass communications channel from the transmitter 18 via the satellite 19 or just normal television broadcasting antenna or FM radio antenna.

Game central 10 has its overall control determined by a programming source 24. As will be described in detail below for statistically sampling the various remote terminals 11 (which might total millions), a random identification number generator 26 is provided. Very briefly, statistical sampling is provided by generating a group of numbers relating to the possible identification numbers of all of the remote terminals and selecting a relatively small fraction of the total number of remote terminals 11 or data sources which represent a random sample or cross section. This is all in accordance with statistical sampling theory in order to produce a valid sample of this allowable error.

Figure 2:
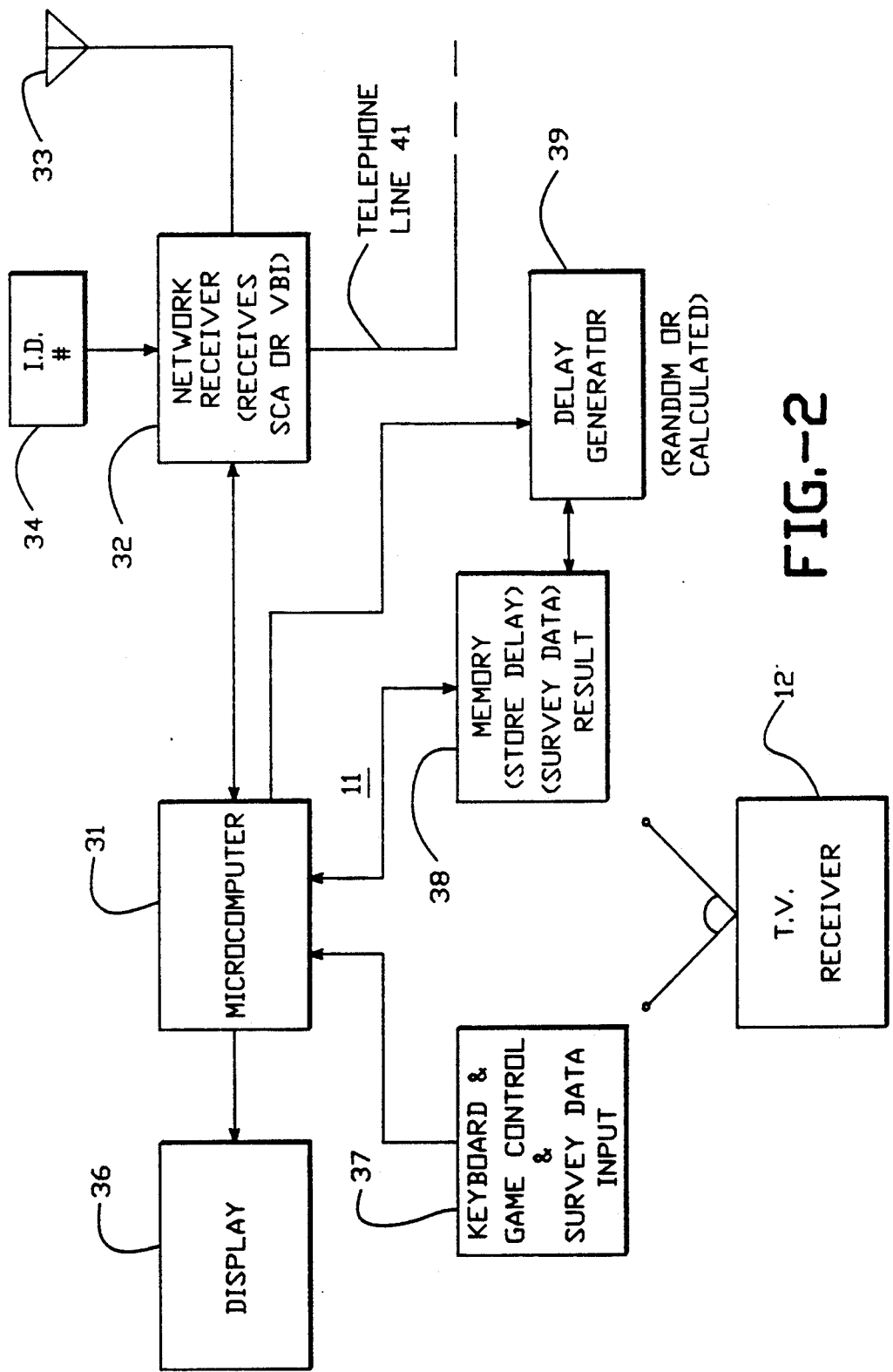
FIG. 2 is a more detailed block diagram of a portion of FIG. 1.

A single remote terminal 11 is shown in detail in FIG. 2 and typically includes a microcomputer 31 (e.g., a personal computer) which is coupled to the transmitted information via a network receiver 32 and an antenna 33. As discussed above, this antenna may receive either the subcarrier of an FM radio station or the vertical blanking interval of a television station or any other mass communications technique. Programmed into the network terminal unique to each remote station is the identification (ID) number 34 which serves to authenticate each remote terminal and in addition allows it to be selected for the statistical sampling as will be discussed below. However, for this purpose other information can be used such as the user's address, phone number, etc.

Also associated with microcomputer 31 are the normal accessories such as a display unit 36, a keyboard input 37, which may be utilized for game playing or control purposes and in general, for the input of any other type of survey data. A memory unit 38 is used for general microcomputer purposes and also as indicated for storing a delay time which will be used to respond via telephone or the dedicated and exclusive communications up-link to the central station 10. This will be described in greater detail in conjunction with the flow chart of FIGS. 4 and 5. With regard to this delay, a delay generator 39 is connected both to memory 38 and microcomputer 31 to be activated by the proper signal from the mass communications channel which is connected to the network receiver 32. Network receiver 32 also controls the access to the telephone line indicated as 41.

Figure 3:
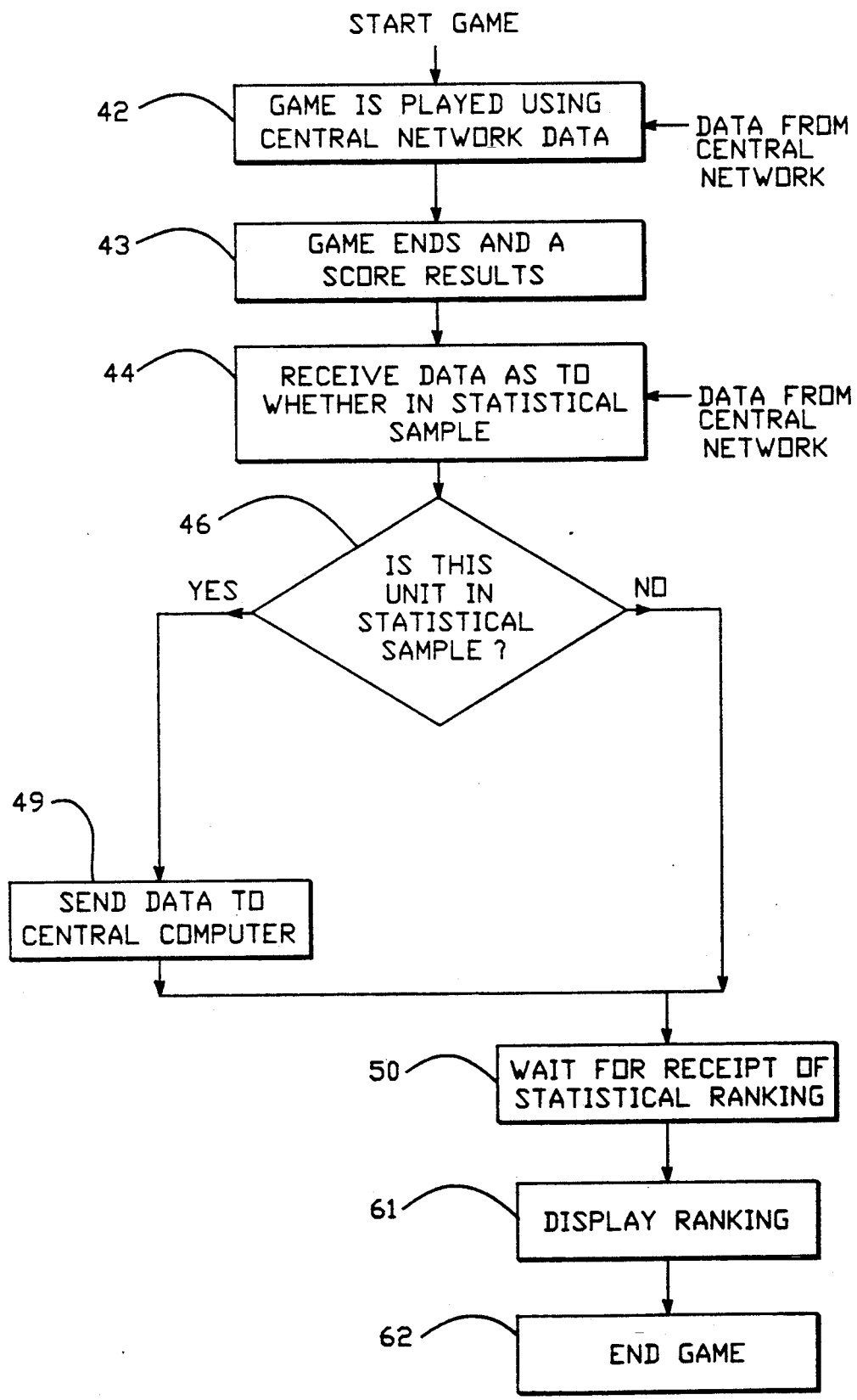
FIG. 3 is a flow chart showing one embodiment of the operation of FIGS. 1 and 2.

The flow chart of FIG. 3 applies both to the operation of the remote terminal 11 shown in FIG. 2 and also interfaces with the operation of game central 10. Referring to the top of the flow chart, game central 10 gives a 'start game' signal. As shown by block 42, the game is played using the data from the central station or network. Such data in a simple situation might include merely lock-out information and scoring information as described in the above Lockton, et al., patent. In a more complex situation a computer game might be played as described in a co-pending application, Ser. No. 365,050 filed June 9, 1989, and assigned to the present assignee.

To continue with the flow chart in the block 43 the game or statistical survey ends, whichever is the case, and a score or answer results. Next, in block 44 data is received from the central network or game central 10 as to whether the particular remote data source 11 is in this statistical sample. This is executed by the block 46 which asks is this unit or remote data source in the statistical sample? This may be determined, referring to FIG. 1, by a comparison of the identification number of the remote source with the random identification number generator generated by unit 26 at the central station. Other techniques, as outlined above, are obviously suitable.

If the remote data source or unit is in the statistical sample, then an instruction is given at this time to send the data to the central computer via the telephone up-link, for example. This is determined by the block 49.

Alternatively, if the unit is not in a statistical sample, step 50 is gone to where the unit waits for receipt of a statistical ranking. This is done as soon as the central station receives the full statistical sample sent to it in step 49. At that time a statistical curve or similar type of data is sent to each remote user and a display ranking occurs on the remote terminal's display unit 36 (see FIG. 2), as indicated by step 61. Then the game or the survey (whatever is the case) is ended in step 62.

Thus, in summary, either game scores or the results of a survey are gained from a large number of remote data sources where only a small fraction of such data sources is required to telephone or up-load their data. At the same time, the user at the remote source—if a game player—still receives his win, loss or relative ranking. On the other hand, if the context of the game is more market research oriented, the fact that the statistical ranking or results of the research will be down-loaded to the consumer serves as an incentive to respond to the initial questions.

Figure 4:
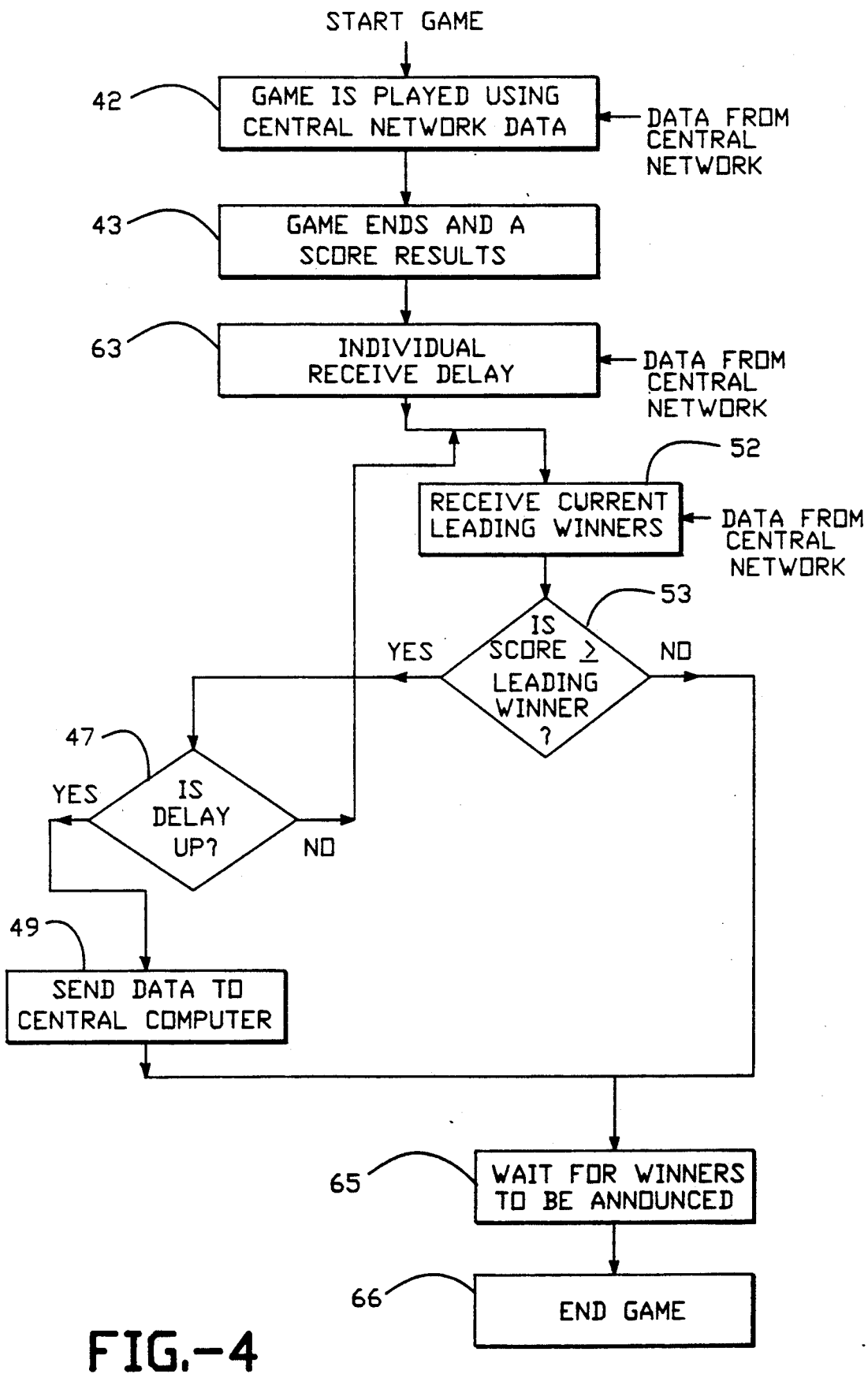
FIG. 4 is a flow chart showing another embodiment.

In the case where there is a "pure" game situation where only winning scores are relevant and overall statistical results are not needed, FIG. 4 illustrates a variation of the method of the present invention. Here, after the game is played as indicated in step 42 and it ends as in step 43, each remote data source or unit is sent (as indicated in step 63) from the central station or network an individual delay time or a method of generating a time delay. Such delay time may be precalculated or random. As illustrated in FIG. 2, it may be based on the serial number or identification number of that particular source. In any case, all that is important is that the delay for each of the remote data sources be relatively unique so that the telephone lines to a central office (or packet unit) are not overloaded. After the downloading from the central station of the individual delays in step 52, data from the central network as to tentative winners is transmitted to the remote units or data sources.

These winners may be thought of as tentative winners since initially when very few responses have been received, the leading winners will change frequently.

Thus, perhaps initially estimated winning scores would be input from the central network but thereafter such tentative winners are based on previous responses from other data sources after their time delay has expired.

Next, in step 53, each data source compares its score with the leading winner. If less, then the 'no' decision route goes to step 65 which is a 'wait for the winners to be announced' and thereafter the end game block 66. If there is a 'yes' decision, meaning that data source has a score greater than or equal to the leading winner, then in step 47 the question is asked "is the time delay completed?" If 'no,' the loop is gone through again. If 'yes,' then this data is sent via step 49 to the central computer. The winners announcement in step 65 would include the final list of winners.

The foregoing system, as illustrated in FIG. 4, by eliminating the statistical survey, is believed to require even fewer telephone connections. This can be illustrated by the following mathematical treatment which assumes that each unit will telephone the central station sequentially.

Assume there are N devices which need to be tested for winner status, and assume that there are W winners to be determined. Assume also that the units are selected one at a time completely random of their score, and that there is a single monotonically increasing ranking for every unit. The first W units to be tested will all require connection to the network since there will not be a list of W current leading winners until they send their scores to the central computer. The probability that the W+1 unit will need to be connected to the network is then $W/w+1$. The expected value of the number of units needing to be connected is then:

$$\bar{n} = w + \sum_{i=w+1}^{N} w/i$$

As an example, suppose 100 winners are to be determined out of a group of 100,000 players. The average number of connections required will then be:

$$\bar{n} = 100 + \sum_{i=101}^{100,000} -100/i \approx 790$$

This is significantly less than the 100,000 connections which otherwise would have been required.

Thus, the foregoing mathematical treatment shows the significantly fewer telephone connections which are required. The same result is similarly achieved with the use of random or precalculated individual time delays.

To even further limit the number of scoring calls, the embodiment of FIGS. 6 and 7 may be used. This is a modification of FIG. 4 where rather than determining the tentative winners from feedback from the data sources, the highest possible score for a game or a known high reasonable score is independently determined. As illustrated in the flow chart of FIG. 6 for the game central unit 10 after the game is played and the score results, the highest possible or reasonable score for the game in step 61 is placed in an output register in the game central unit or its associated computer; if the game has been played before, a known high score may be inputted. Then as illustrated in step 62, the contents of the output register memory are sent to the remote terminals 11. Referring briefly to FIG. 7, this score in step 63 is waited for and then in step 64 is compared with the players actual score value since it would be less in almost all cases, the NO path 66 is taken to the decision step 67 asking if the scoring period is over, and if the answer is yes, then this remote terminal unit is done, as shown in step 68. However, if the player's score is greater or equal to the high score value, the YES path 69 is taken to step 72, wherein this score is inputted to the game central unit 10. In this case, in step 72, referring to FIG. 6 the question is asked was there an incoming score? If yes, this may be the actual winner, and in step 73 the highest incoming score is put in the output register. And then the other inputs are waited for and if no more occur, then the game is over.

Alternatively, if there is no incoming score for step 72 and the NO answer goes to step 74 where the high score value is reduced and stored in the output register in step 62 and the whole process repeated until an incoming score is received. With this technique, if, for example, the score value is just decremented one point at a time and then there is a wait of a few minutes between decrements, only the winner or winners are required to call. Thus, a minimum number of "up-loads" or call-backs are provided. If larger decrements are used or less time is taken between decrements, a few non-winning scores may also be received.

Figure 5:
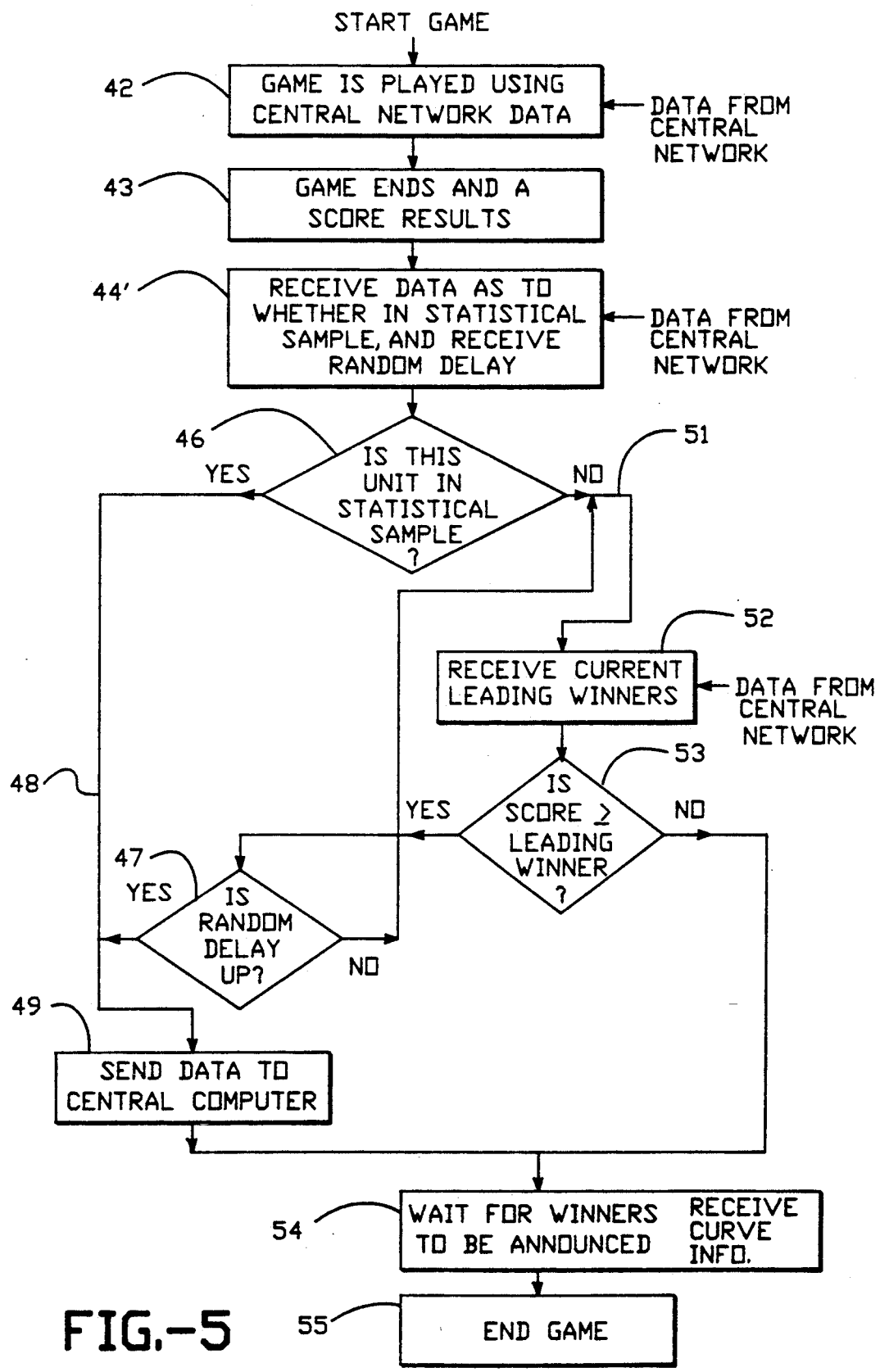
FIG. 5 is a flow chart showing another embodiment.

FIG. 5 illustrates a method which combines the statistical survey technique of FIG. 3 with the winner comparison technique of FIG. 4. Thus, steps 42 and 43 as to the game being played and a score resulting are the same. In step 44' data from the central network is received both as to whether or not the particular unit is in the statistical sample and a random delay is also given each unit. If the unit is in the statistical sample, as shown in step 46, then this data is sent to the central computer via step 49 over the 'yes' logic output line 48. At the same time this information on the 'yes' decision route 48 is ended with block 47 as to whether the random delay time is completed and the information then is sent to the central computer.

After this statistical sample is gained, then the data from the central network determines a tentative winner's curve, as shown in step 52 and 53. As discussed above, the score of the remote data source is compared to the tentative winners' score. If it is less, then step 54 is gone to for waiting for winners to be announced and to receive the statistical curve information.

If the score is greater than or equal to the leading winner, then the 'yes' route of decision block 53 is taken and after the random delay is up, that data is sent to the central computer. And thereafter the game is ended in step 55.

In summary, the foregoing method of FIG. 5 provides both a statistical curve and also limits the uploading of information via, for example, the telephone line. And from a statistical point of view, according to market research statistics, no matter how large the universe of participants, a truly random sample of, for example, 2,000 users can place an individual's score with 95% accuracy ±2%. Thus, by the foregoing techniques using statistical sampling or in addition, of providing immediate feedback as to tentative winners (as shown in FIG. 4), saves significant time and overloading of, for example, a telephone exchange.

And the same technique may be used in a marketing survey as briefly discussed above. For example, in connection with a network news telecast, the large viewing audience for this type of programming might generate hundreds of thousands of responses. Only 2,000 are actually required to provide results with the required degree of accuracy.

From a more specific game standpoint, scoring of a baseball game for example would generally have several categories of winners up to some fixed maximum. Categories might be established for strikeouts, home runs and stolen bases. The game players with the largest point totals in these categories will be winners.

The available categories for each case will be kept in an event type file. If scoring is available for an event type, the first winner category will always be "overall winner" (the player with the highest score). After this scoring game specific categories may be specified—strikeouts, etc., as discussed above.

In summary, the primary feature of the present invention is to reduce the number of telephone calls after a game or event is over.

The second feature is the ability to rank all of the players by using a relatively small number of samples of the game scores. This is done by statistically selecting a small number of players to have their scores sent to the central computer. From these scores a statistical curve is established. This percentile ranking profile is then sent to all the game units and each remote source will display the percentile ranking of all the players.

Alternatively, the same object is achieved without statistical sampling by continuously updating the tentative winners, thus avoiding telephone calls from game players with lower scores.

Finally, a third feature of the invention is the ability to determine accurate and projectable market information from a large number of remote sources. This is again done by taking a statistical sample and using those inputs to project the responses of the larger population of players. This market information could be in the form of answers to specific questions.

Thus an improved method of evaluating data relating to a common subject from a plurality of remote data sources has been provided.

We claim:

1. A method of evaluating data relating to a game of skill or chance where each of said data sources includes at least one player of such game who receives one or more scores, and where each source may be down-loaded information on a one-way mass communications link from a central station but must up-load data from each of the remote sources to a central station by a dedicated and exclusive communications up-link, said method comprising the following steps:

playing said game with each player receiving a score;
down-loading from said central station to each of said remote sources an individual delay time or information which will allow the determination of a time delay;
transmitting via said mass communications link to all of said data sources, data as to the tentative winners, such data being based on previous responses from other said data sources after said respective time delays;
for each data source comparing the score of said tentative winner with the score of said particular data source;
and if said compared score of said particular data source is greater than or equal to said tentative winner's score, up-loading, after said time delay, said data to said central station for use in recomputing said tentative winners, and eventually in determining the final winners.

2. A method of evaluating data relating to a game of skill or chance where each of of a plurality of remote data sources includes at least one player of such game who receives one or more scores, and where each source may be down-loaded information on a one-way mass communications link from a central station but must up-load data from each of the remote sources to a central station by a dedicated and exclusive communications up-link, said method comprising the following steps:

playing said game with each player receiving a score;
determining data as to highest reasonable score of a tentative winner;
transmitting via said mass communications link to all of said data sources, said data as to the highest reasonable score of a tentative winner;
for each data source comparing the score of said tentative winner with the score of said particular data source;
and if said compared score of said particular data source is greater than or equal to said tentative winner's score, up-loading said data to said central station for use in determining the final winner;
and if no score is up-loaded, reducing said highest reasonable score of a tentative winner score and repeating the above steps of transmitting and comparing.

* * * * *